(12) United States Patent
Cong et al.

(10) Patent No.: US 10,514,548 B1
(45) Date of Patent: Dec. 24, 2019

(54) LASER ANIMATION DISPLAY METHOD

(71) Applicants: Beijing Central Press Union Technology Co., Ltd., Beijing (CN); Sen Cong, Beijing (CN)

(72) Inventors: Sen Cong, Beijing (CN); Liang Zhong, Beijing (CN); Hao Wang, Beijing (CN); Pingping Ma, Beijing (CN)

(73) Assignees: BEIJING CENTRAL PRESS UNION TECHNOLOGY CO., LTD., Beijing (CN); Sen Cong, Beijing (CN)

( * ) Notice: Subject to any disclaimer, the term of this patent is extended or adjusted under 35 U.S.C. 154(b) by 0 days.

(21) Appl. No.: 16/017,653

(22) Filed: Jun. 25, 2018

(51) Int. Cl.
| | |
|---|---|
| *G02B 27/09* | (2006.01) |
| *G03B 21/43* | (2006.01) |
| *F21V 5/00* | (2018.01) |
| *G03B 21/20* | (2006.01) |
| *G02B 5/02* | (2006.01) |

(52) U.S. Cl.
CPC .......... *G02B 27/0916* (2013.01); *F21V 5/002* (2013.01); *G02B 5/021* (2013.01); *G03B 21/2033* (2013.01); *G03B 21/43* (2013.01)

(58) Field of Classification Search
CPC ...... G03B 21/20; G03B 21/021; G03B 21/43; G03B 21/2013; G03B 21/2033; G02B 27/0916; G02B 27/0922; G02B 27/0933; G02B 27/0944; G02B 5/021; G02B 5/0215; G02B 5/0231; G02B 5/0236
See application file for complete search history.

(56) References Cited

U.S. PATENT DOCUMENTS

| | | | |
|---|---|---|---|
| 9,942,539 B2 * | 4/2018 | Tait ...................... | H04N 13/363 |
| 2014/0313779 A1 * | 10/2014 | Higgins ................. | F21S 8/035 362/643 |
| 2017/0329211 A1 * | 11/2017 | Chien ...................... | G01V 8/20 |

* cited by examiner

*Primary Examiner* — Sultan Chowdhury
(74) *Attorney, Agent, or Firm* — Sinorica, LLC

(57) ABSTRACT

The present invention discloses a laser animation display method. A display system includes three parts, i.e., a laser source, a diffraction optical element and a mechanical driving device. The display method includes the following steps: S1: the laser source emits laser at first, and the laser is caused to be incident on the pattern of a first microstructure on the diffraction optical element; S2: the diffraction optical element is driven by the mechanical driving device to translate to irradiate the pattern of a second microstructure of the diffraction optical element with the laser, and the patterns on other microstructures are sequentially irradiated with the laser according to the same method; and S3: cyclic movement is kept, thereby achieving an animation effect on a screen. The present invention implements laser animation display on the premise of no additional motion control unit and almost no increase of the system size and cost.

10 Claims, 8 Drawing Sheets

LASER ANIMATION DISPLAY METHOD

TECHNICAL FIELD

The present invention relates to an animation display method, and particularly relates to a laser animation display method.

BACKGROUND ART

A laser lamp mainly includes three parts, i.e., a laser light source, a mechanical motion device and a diffraction optical element. Micrometer/nanometer-scale steps are machined on the surface of the diffraction optical element, and by virtue of a diffraction effect of the steps on light, the diffraction optical element may output incident dot laser as a required image. The laser lamp may implement long-distance high-brightness image display by virtue of the characteristics of high brightness and high collimation of laser, and thus have been rapidly developed in the European and American markets and the domestic market in recent years.

Laser lamp has been developed for more than 10 years, but most of laser lamp products on the present market may display static images only. For enriching displayed contents and improving a display effect, a laser lamp is required to implement dynamic display of an image, that is, image conversion, image translation and image rotation are required to be freely implemented. A laser lamp is a mass consumer product, and how to achieve an ideal dynamic display effect without remarkably increasing cost and system complexity is a problem urgent to be solved in the industry. For achieving a good dynamic image display effect, overall optimization over an optical design of a diffraction optical element, an arrangement manner for each frame of image and a mechanical motion device is required.

At present, a mainstream laser lamp product mainly displays a static image or a combination of internally unrelated static images. There are only a few products capable of implementing dynamic image display to a certain extent with a non-ideal effect.

SUMMARY OF THE INVENTION

In order to solve the problem mentioned in the Background Art, the present invention provides a laser animation display method.

According to the laser animation display method of the present invention, a display system includes three parts, i.e., a laser source, a diffraction optical element and a mechanical driving device, wherein the diffraction optical element is arranged on the mechanical driving device, multiple microstructures including phase information of associated patterns are arranged on the diffraction optical element, each microstructure corresponds to a different frame of image, and the diffraction optical element is driven by the mechanical driving device to perform relative translation motion relative to a laser beam emitted by the laser source; and the mechanical driving device is divided into two types, i.e., a linear driving device and a circumferential driving device.

The laser animation display method includes the following steps:

S1: the laser source emits laser at first, and the laser is caused to be incident on the pattern of a first microstructure on the diffraction optical element which is placed perpendicular to a plane in a propagation direction of the laser, thereby containing the phase information of the pattern and then forming a corresponding static pattern on a screen;

S2: the diffraction optical element is driven by the mechanical driving device to translate and change its position relative to the incident laser beam in a plane in which the diffraction optical element is located to irradiate the pattern of a second microstructure of the diffraction optical element with the laser, thereby changing the pattern formed by irradiation of the laser, and the patterns on the other microstructures on the diffraction optical element are sequentially irradiated with the laser according to the same method; and S3: Step S2 is repeated, and the patterns on the diffraction optical element are kept cyclically moved under driving of the mechanical driving device, thereby achieving an animation effect on the screen of the terminal.

The microstructures including the phase information are arranged on the diffraction optical element of the present invention. The associated patterns mentioned herein refer to different associated patterns and refer to that the patterns forming an animation are associated. For example, an object moves from one end to the other end, such a motion process may be changed into a combination of multiple static patterns, and each pattern corresponds to different phase information, and can be understood as continuous different frames of patterns in the animation. The phase information refers to a phase of a light wave, reaching the diffraction optical element, of the laser, and the phase may be changed by the diffraction optical element, that is, the phase of the light wave reaching the diffraction optical element is different from a phase of the light wave transmitted through the diffraction optical element.

A collimated laser unit emits a beam of laser of which a propagation direction is parallel to a horizontal plane. The laser is incident on the diffraction optical element placed perpendicularly to the horizontal plane to contain phase information capable of forming a specific single pattern on the screen of the terminal. The diffraction optical element is driven by the mechanical driving device to change its position relative to the incident laser beam in the plane in which it is located to irradiate the position, including the phase information of another pattern, of the diffraction optical element with the laser to change the pattern formed by irradiation of the laser. Such a change in the position of the diffraction optical element changes the displayed pattern. Since there is a visual persistence effect for human eyes, the animation effect is achieved. The diffraction optical element of the present invention is a periodic optical element prepared from a material such as quartz and plastics, step-like three-dimensional structures are formed on its surface, the geometric sizes of single steps are nanometer-scale, and the depth of each step-like structure is slightly different. When the laser is perpendicularly incident on the surface of the element, the laser contains different information due to different structural depths, and the laser containing the information is not propagated along the original direction any more but is deflected, and after being propagated by a certain distance, forms specific patterns.

Preferably, the mechanical driving device of the present invention is a linear driving device, and includes an inner frame, a middle frame and a rotating shaft, the diffraction optical element is arranged on the inner frame, the multiple microstructures with the patterns are arranged abreast on the diffraction optical element, and a guide hole is formed in the inner frame; a guide groove is formed in the inner side of the middle frame, and the inner frame is arranged in the guide groove of the middle frame; and one end of the rotating shaft is arranged in the guide hole, the other end of the rotating shaft is connected with a rotating handle, and the rotating handle is driven by a motor to enable the rotating shaft to drive the inner frame to perform linear translation motion, so that each frame of pattern on the microstructures is sequentially swept by the laser beam.

Preferably, the mechanical driving device of the present invention is a circumferential driving device, and includes an inner frame, a sheet metal part and a rotating shaft; the diffraction optical element is arranged on the inner frame, two groups of microstructures are arranged on the diffraction optical element, and each group of microstructures consists of multiple single microstructures with patterns; at least two through holes are formed in the sheet metal part, two beams of laser pass through the through holes to irradiate the patterns of the corresponding groups of microstructures of the diffraction optical element respectively, one end of the rotating shaft is fixedly connected with a transmission shaft, the other end of the rotating shaft is connected with the inner frame in a rotating manner, and when the rotating shaft rotates, the rotating shaft may drive the inner frame to perform translation motion; and by the translation motion of the inner frame, the patterns of the microstructures on the inner frame perform circumferential motion relative to the laser.

Preferably, each microstructure of the present invention has a rectangular surface shape and consists of multiple nanometer-scale rectangular steps, and the length and width of each single microstructure are both greater than the spot diameter of the laser.

Preferably, the multiple microstructures on each diffraction optical element have the same shape and size, and every two adjacent microstructures are closely arranged.

In the present invention, the light source is a semiconductor laser unit emitting a laser spot with a certain width and a millimeter-scale diameter. The size of each single microstructure should not be smaller than the size of the laser spot, otherwise the laser spot, in a running process of the mechanical device, not only covers the single microstructure but also covers the microstructure of another pattern to cause overlapped display of two frames of animations. In addition, the size of each single microstructure should not be excessively large, otherwise the laser spot may sweep the pattern for too long in a running process of the display system so as not to achieve the animation effect, and the mechanical device may also be oversized to increase the cost. Changing a rotating velocity of the motor in the mechanical driving device may reduce the stable performance of the whole system and shorten the service life. Therefore, the size design of the single microstructures is required to be considered by integrating multiple factors.

In addition, relative positions of the adjacent microstructures are also required to be considered. An excessively long distance between two adjacent frames of images may cause direct emergence of the laser on a display surface without passing through the microstructures in a motion process, and since the laser has a relatively high light intensity, such a method may be dangerous. An excessively short distance between two adjacent frames of images may cause simultaneous overlapped display of the animations described above. Therefore, every two adjacent frames of animations are closely arranged without partial overlapping as well as a gap therebetween.

Preferably, when the pattern or part of the pattern on each microstructure on the diffraction optical element is centrosymmetric about a certain point, the geometric center of the whole pattern is moved to the point; and when the pattern is a non-centrosymmetric or non-partially centrosymmetric pattern, an off-axis design method is adopted to make an unexpected pattern far away from the geometric center of the pattern.

The shapes of the original patterns are required to be fully considered during design of the diffraction optical element. This is because, under limits of a machining process, there is not only a designed expected pattern but also a diffraction pattern which is centrosymmetric with the pattern and has a much lower intensity on the screen of the terminal, which is unexpected. Therefore, in a design process, if the pattern or part of the pattern is centrosymmetric about a certain point, the geometric center of the whole pattern is required to be moved to the point during design to maximally reduce and even eliminate the influence of the unexpected diffraction pattern on the original pattern. For example, in a windmill pattern, four fan blades are rotationally symmetric about the central point, that is, the geometric center of a windmill is the central point, and in a design process, the central point of the windmill is placed at a zeroth-order diffraction position, i.e., a position of a laser spot.

In addition, for the non-centrosymmetric or non-partially centrosymmetric pattern, in order to reduce the influence of the unexpected diffraction pattern on the original pattern, the off-axis design method is required to be adopted to make the unexpected pattern far away from the geometric center of the pattern. At this moment, the unexpected diffraction pattern still exists, but the two have been spaced by a certain distance, so that interference to the original pattern is avoided.

The propagation direction of the laser is an axis. It is important to note that the diffraction optical element is a complex grating, and the grating is a light splitting optical device and splits the light of most of energy into three parts:

1: zeroth-order diffraction, i.e., the central bright point, the center point being overlapped with the propagation direction of the laser;

2: plus first-order diffraction, i.e., the expected pattern, a pattern expected to be obtained in the present invention; and 3: minus first-order diffraction, i.e., the unexpected pattern, a pattern unexpected to be obtained in the present invention, the pattern being centrosymmetric about the zeroth-order diffraction point with the plus first-order diffraction.

Under a non-off-axis condition, overlapping of the centers of the plus and minus first-order patterns and the zeroth-order diffraction point reduces the quality of the plus first-order diffraction pattern. An off-axis design refers to that the first-order diffraction pattern is far away from the zeroth-order diffraction point (the zeroth-order diffraction is the axis), so that the plus first-order diffraction pattern is spaced from both of the zeroth-order diffraction and the minus first-order diffraction by a certain distance, and the quality of the expected pattern is ensured.

Preferably, a motion velocity of the mechanical driving device is equal to a movement velocity of the microstructures on the diffraction optical element.

An animation is a dynamic display process of a series of static patterns. Since there is the visual persistence effect for the human eyes, when the mechanical device in the system motions at a certain velocity V1, V1 referring to a linear motion velocity of the device driven by rotation of the motor, and the microstructures keep changing at a certain velocity V2 to implement dynamic display, wherein V1=V2.

In the present invention, for the circumferential driving device, the movement velocity of the microstructure=the rotating velocity of the motor×7.5; and for the linear driving device, the movement velocity of the microstructure=the rotating velocity of the motor×3.9.

In the present invention, the depth of each step in the single microstructures and a wavelength of the laser meet the following formula:

$$h = \frac{(2^N - 1)\lambda}{2^N(n-1)},$$

wherein h is the depth of the step, $\lambda$ is the wavelength of the laser, n is a refractive index of the material, and $2^N$ is the number of the steps.

In order to implement the dynamic display process of the images better, a geometric parameter, for example, the size of each single microstructure, the relative positions of the adjacent microstructures and an arrangement manner for the microstructures, of the diffraction optical element is required to be considered during design. Besides the three factors, the widths and depths of the steps in the single microstructures are also required to be considered. For example, at a specified distance, if the expected pattern is larger, the widths of the steps are smaller. In addition, if the wavelength of the laser for irradiation is larger, the depths are larger.

The arrangement manner for the microstructures is preferably required to be changed according to a difference of the animation display system. The animation display system includes two linear and circumferential mechanical driving devices, and the two different mechanical devices correspond to different microstructure arrangement manners.

Preferably, when the mechanical driving device is a linear driving device, the multiple patterns of the diffraction optical element are closely arranged in a row to form a long strip in parallel with the long edge direction of the mechanical driving device; and when the mechanical driving device is a circumferential driving device, the patterns on the diffraction optical element are rectangles formed by combining at least two or more microstructures in length and width, and the circumferential driving device includes a non-gear type driving device and a gear type driving device.

The design parameter of the diffraction optical element may bring influence to dynamic pattern display, and different parameters may also have influence on the sizes, brightness and the like of the patterns. As mentioned above, the step-like three-dimensional structures are formed on the surface of the diffraction optical element, and the size of each step is nanometer-scale. In the present invention, when the width of the step is 800 nm, the size of the pattern is 350 mm*200 mm at a position 1 m far away from the system, and if the width of the step is changed into 400 nm, the size of the pattern is 770 mm*430 mm at the same distance.

As shown in FIG. 12, the present invention follows the following formula:

$$d = \frac{\lambda}{2\sin\theta}$$

$$\tan\theta = \frac{D}{2Z},$$

wherein D is the size of the pattern, Z is a distance between the diffraction element and a plane of the pattern, $\theta$ is a half emission angle, i.e., a half of an emission angle, d represents the width of each step and $\lambda$ represents the wavelength of the laser. FIG. 13 shows a photo obtained by observing a microstructure with an atomic force microscope in the present invention. In the photo, it is shown that d represents the width of each step in the microstructures.

Beneficial Effects:

1: on the premise of no additional motion control unit and almost no increase of the system size and cost, a novel mechanical driving device is combined to design a novel arrangement manner for each frame of image to implement dynamic image display of a laser lamp;

2: the design of the diffraction optical element and the design of the mechanical driving device are fully considered and organically combined;

3: a structure of a prevent mainstream laser lamp product is taken as a basis for development, so that technological upgrading with as-low-as-possible cost in the laser lamp industry is facilitated, and key technical problems in an upgrading and updating process of the laser lamp industry are solved; and 4: a conventional animation system usually adopts white light as a backlight source and adopts three red, green and blue liquid crystal boards as control layers of red, green and blue light respectively, the white light source is split into red, green and blue light by a dichroic mirror group, and the light in the three colors is projected on the three liquid crystal boards to generate image information respectively, then synthesized and projected on a projection screen by a projection lens to form a color image.

Compared with the system of the present invention, the conventional animation system mainly has the following three disadvantages.

First, the light source of the conventional animation system is low in brightness, the contrast is low when background light is relatively strong, the intensity of the laser source is multiple magnitude orders higher than that of an ordinary light source, and a high-brightness image may also be formed under a complex background light condition.

Second, the conventional animation system uses the projection lens for imaging. Because of an object-image relationship of a lens, a clear image may be formed at a specific position only, which belongs to localized imaging. If the position of an imaging plane is expected to be changed, a relative position of an object plane and the projection lens is required to be regulated. This manner requires a specific structure and is relatively complex in system. Compared with the conventional animation system, the laser imaging system of the present invention adopts nonlocalized imaging, is simple in structure, and may implement imaging in any plane, and no complex imaging system is required.

Finally, the conventional animation system is relatively complex in overall structure and relatively high in construction cost, and the system of the present invention is relatively low in construction cost.

DESCRIPTIONS ABOUT THE MAIN REFERENCE NUMBERS

Figure 1:
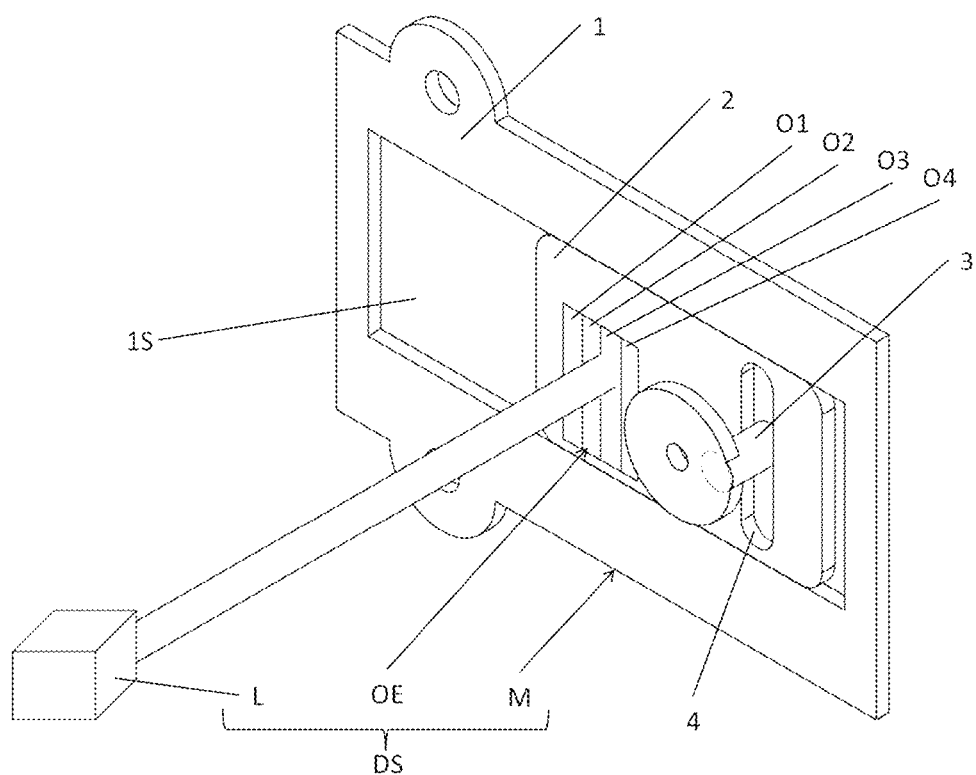
FIG. 1 is a solid diagram of a linear driving device according to an embodiment 1.

1—middle frame, 2—inner frame, 3—rotating shaft, 4—guide hole, 6—laser lamp light, 6—rotating handle, 7—second outer frame holder, 8—second middle frame, 9—second inner frame, 10—first sheet metal part, 11—first through hole, 12—second through hole, 13—second rotating shaft, 14—first microstructure group, 15—second microstructure group, 16—third inner frame, 17—second sheet metal part, 18—third microstructure group, 19—fourth microstructure group, 20—first gear, 21—second gear, 22—third gear, 25—third through hole, 26—fourth through hole, 27—third rotating shaft, and 28—fourth rotating shaft.

DETAILED DESCRIPTION OF THE INVENTION

Exemplary embodiments of the present invention will be introduced below in combination with the drawings of the specification and implementation of the present invention will be proved with examples. The present invention may be completely introduced to those skilled in the art to make its technical contents clearer and convenient to understand. The present invention may be embodied by various embodiments in different forms, and the scope of protection of the present invention is not limited to the embodiments mentioned in the present invention. The drawings and descriptions of the present invention are substantially intended not to limit but to exemplarily describe the present invention.

The below is only the preferred embodiments of the present invention. It should be point out that those of ordinary skilled in the art may further make a plurality of improvements and transformations without departing from the technical principle of the present invention and these improvements and transformations shall also fall within the scope of protection of the present invention.

Embodiment 1

The embodiment provides a laser animation display method. A display system includes three parts, i.e., a laser source, a diffraction optical element and a mechanical driving device, wherein the diffraction optical element is arranged on the mechanical driving device, multiple microstructures including phase information of associated patterns are arranged on the diffraction optical element, each microstructure corresponds to a different frame of image, and the diffraction optical element is driven by the mechanical driving device to perform relative translation motion relative to a laser beam emitted by the laser source; and the mechanical driving device is a linear driving device.

The laser animation display method includes the following steps:

S1: the laser source emits laser at first, and the laser is caused to be incident on the pattern of a first microstructure on the diffraction optical element which is placed perpendicular to a plane in a propagation direction of the laser, thereby containing the phase information of the pattern and then forming a corresponding static pattern on a screen;

S2: the diffraction optical element is driven by the mechanical driving device to translate and change its position relative to the incident laser beam in a plane in which the diffraction optical element is located to irradiate the pattern of a second microstructure of the diffraction optical element with the laser, thereby changing the pattern formed by irradiation of the laser, and the patterns on the other microstructures on the diffraction optical element are sequentially irradiated with the laser according to the same method; and S3: Step S2 is repeated, and the patterns on the diffraction optical element are kept cyclically moved under driving of the mechanical driving device, thereby achieving an animation effect on the screen of the terminal.

Figure 2:
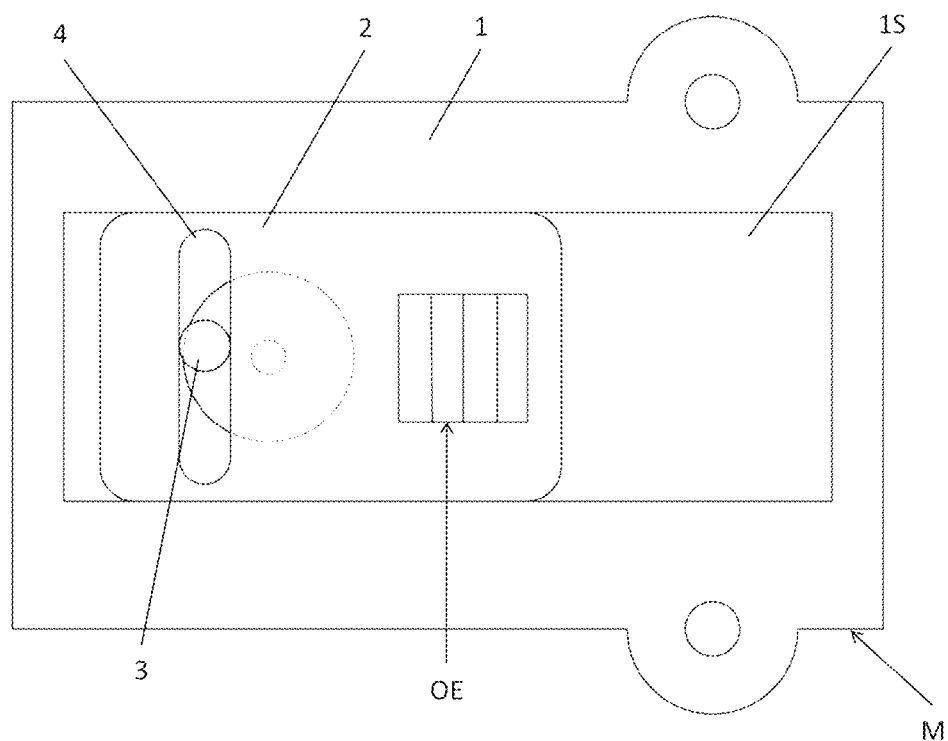
FIG. 2 is a front view of the linear driving device according to the embodiment 1.
Figure 3:
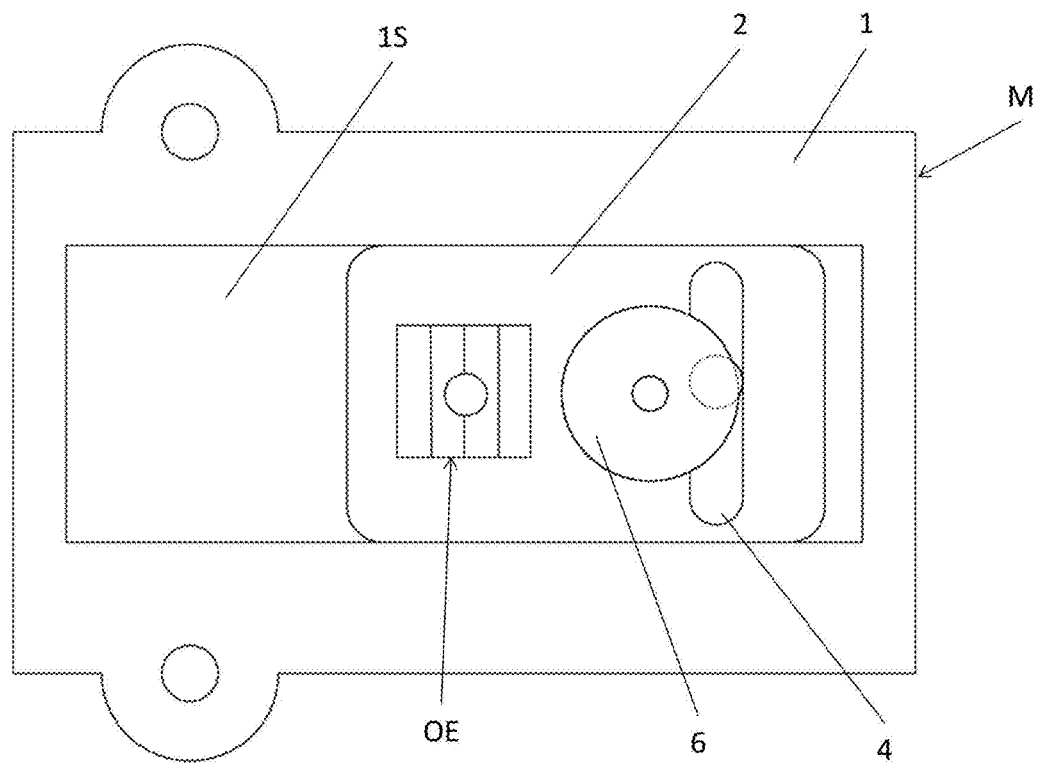
FIG. 3 is a rear view of the linear driving device according to the embodiment 1.
Figure 4:
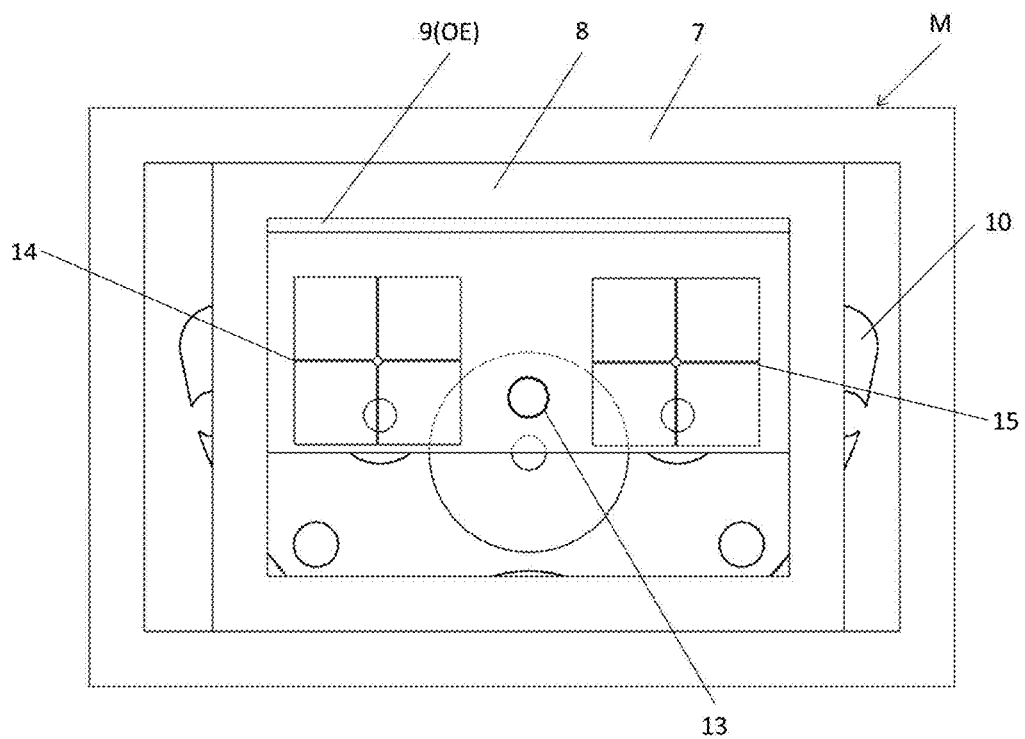
FIG. 4 is a front view of a non-gear type driving device according to an embodiment 2.
Figure 5:
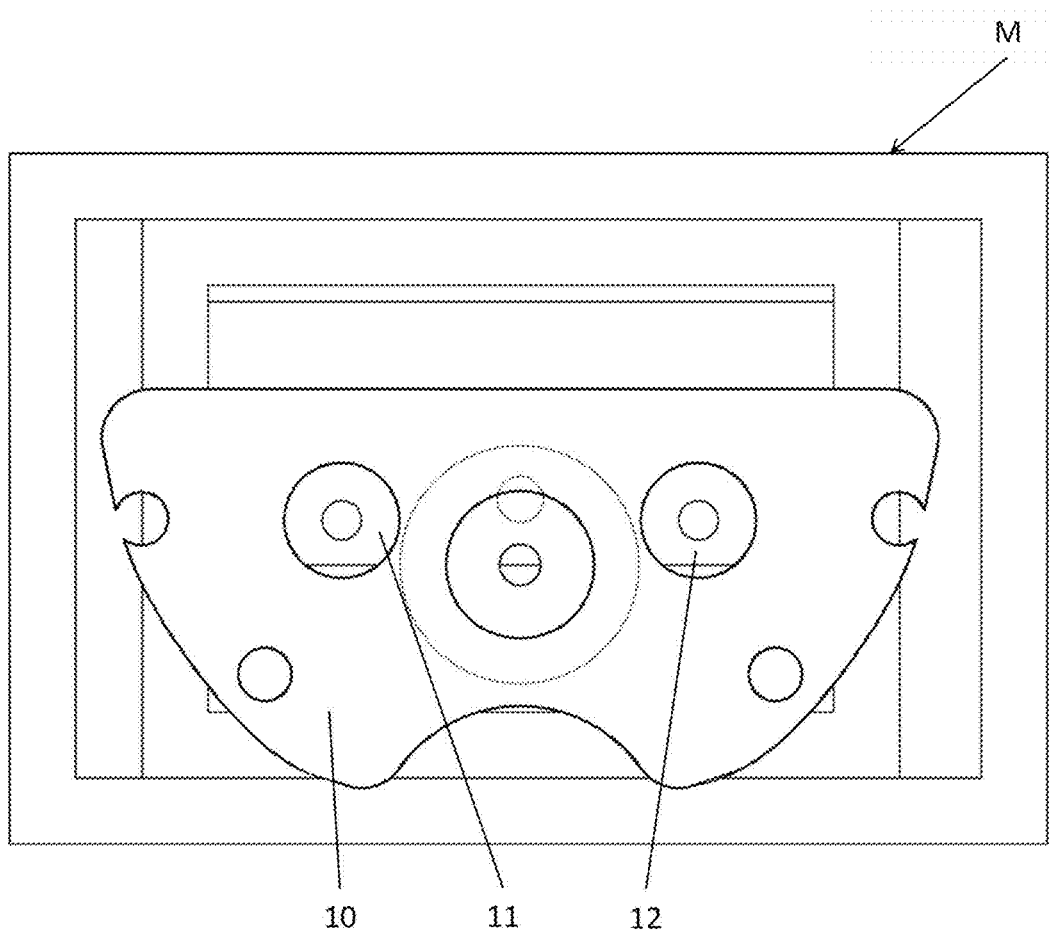
FIG. 5 is a rear view of the non-gear type driving device according to the embodiment 2.
Figure 6:
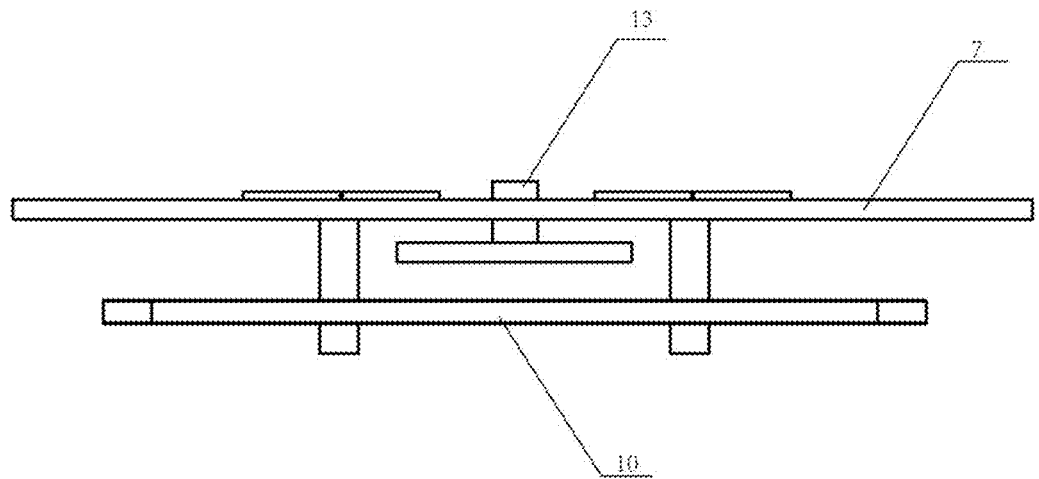
FIG. 6 is a top view of FIG. 5.
Figure 7:
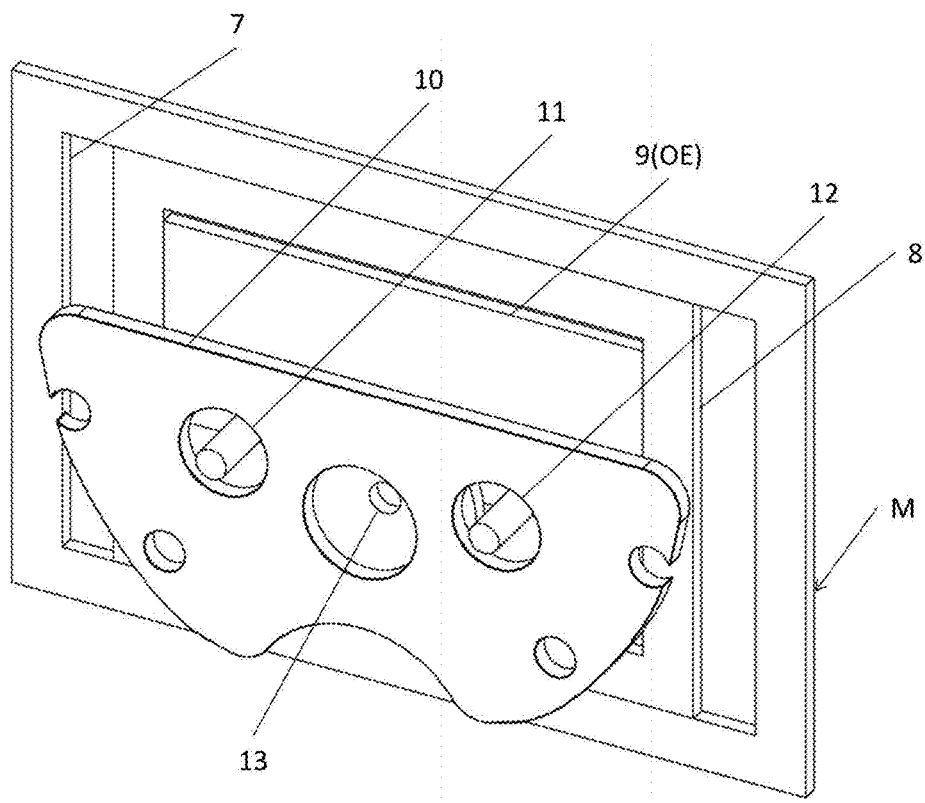
FIG. 7 is a solid diagram of the non-gear type driving device according to the embodiment 2.
Figure 8:
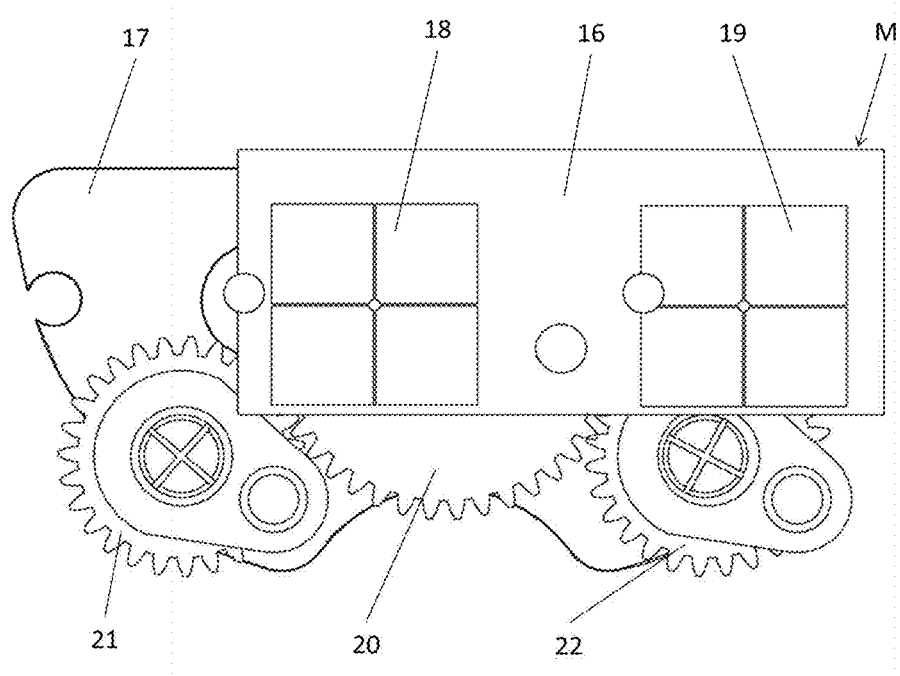
FIG. 8 is a front view of a gear type device according to an embodiment 3.
Figure 9:
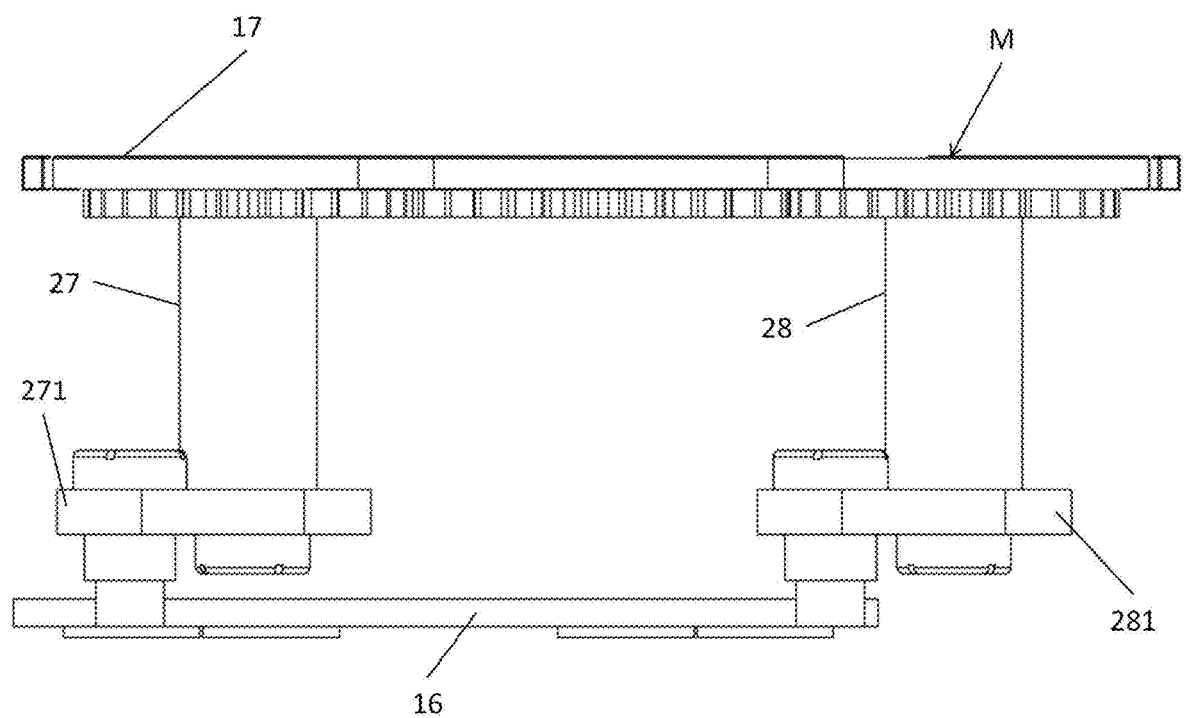
FIG. 9 is a top view of FIG. 8.
Figure 10:
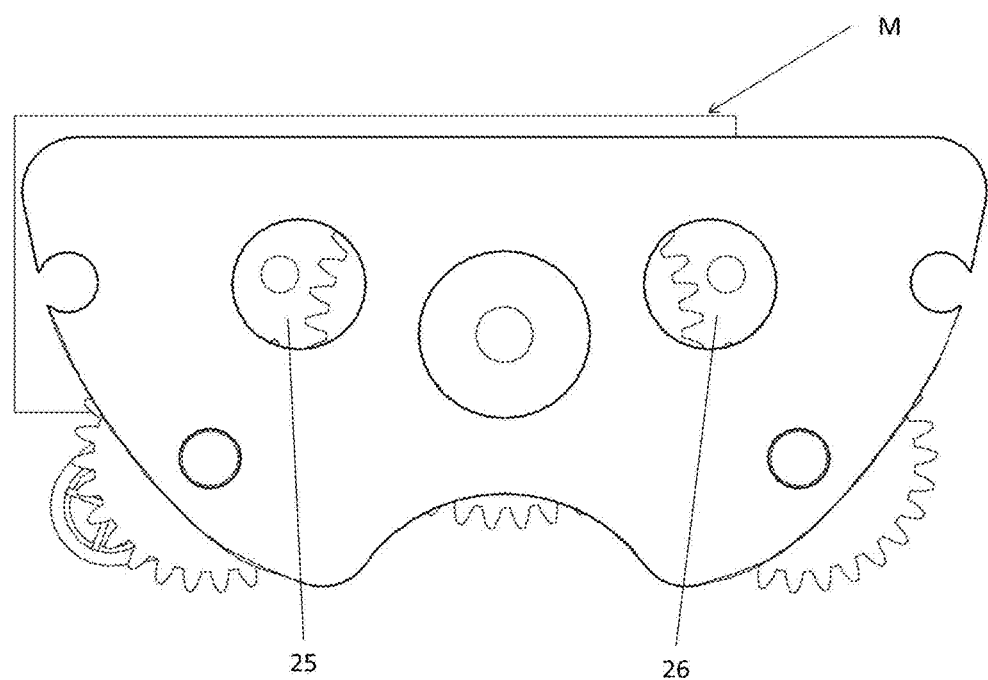
FIG. 10 is a rear view of the gear type device according to the embodiment 3.
Figure 11:
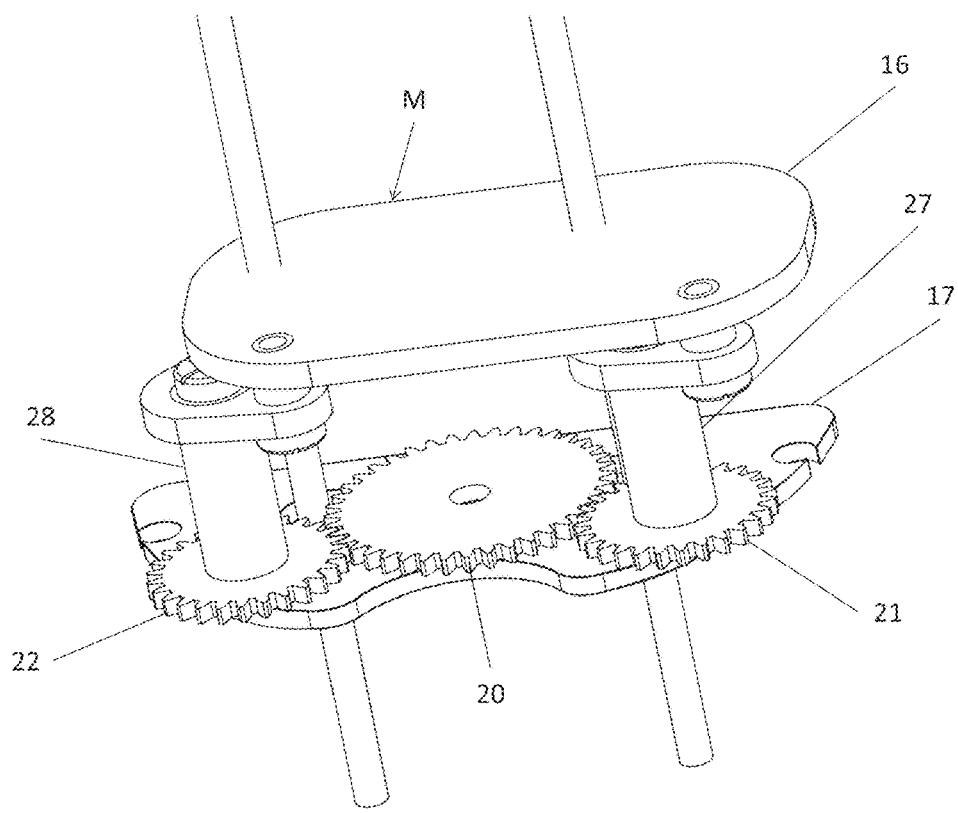
FIG. 11 is a solid diagram of the gear type device according to the embodiment 3 (when four corners of an outer edge of a rectangular inner frame are arc-shaped)
Figure 12:
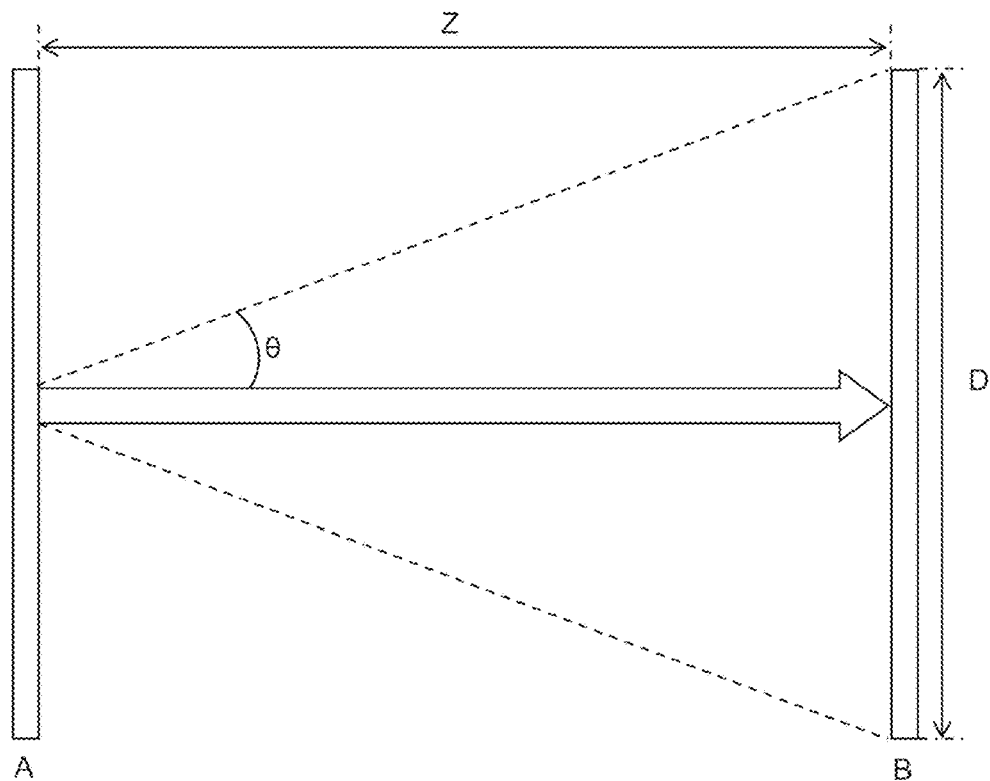
FIG. 12 is a schematic diagram of a relational expression.

As shown in FIGS. 1-3, the linear driving device of the embodiment includes an inner frame 2, a middle frame 1 and a rotating shaft 3. The inner frame 2 is arranged in the middle frame 1, a guide hole 4 is formed in the inner frame 2, and one end of the rotating shaft 3 is arranged in the guide hole 4 and can move upwards and downwards in the guide hole 4 and drive the inner frame 2 to perform translation motion in the middle frame 1. Laser lamp light 5 can be directly emitted on the patterns of the microstructures of the inner frame 2. The other end of the rotating shaft 3 is connected with a rotating handle 6, and the rotating handle 6 can be rotated to enable the rotating shaft to drive the inner frame 2 to perform the translation motion, wherein when the inner frame 2 performs the translation motion, each frame of pattern on the microstructures is sequentially swept by a laser beam to form dynamic image display.

The linear driving device of the embodiment further includes an outer frame holder for fixing the middle frame 1. The surface of the guide groove in the inner side of the middle frame 1 is attached to the outer lateral surface of the inner frame 2, so that the inner frame 2 may perform translation motion in the middle frame 1 only. The guide hole in the inner frame and the guide groove in the middle frame can co-act to convert circumferential motion of the rotating handle 6 into linear motion of the inner frame 2, so that the inner frame 2 can linearly and reciprocally motion, and the pattern on each frame of microstructure on the inner frame is sequentially swept by the laser beam to achieve a dynamic display effect. In a display process of each frame, for preventing jitter of the patterns, the diffraction optical element only allows translation motion.

Figure 13:
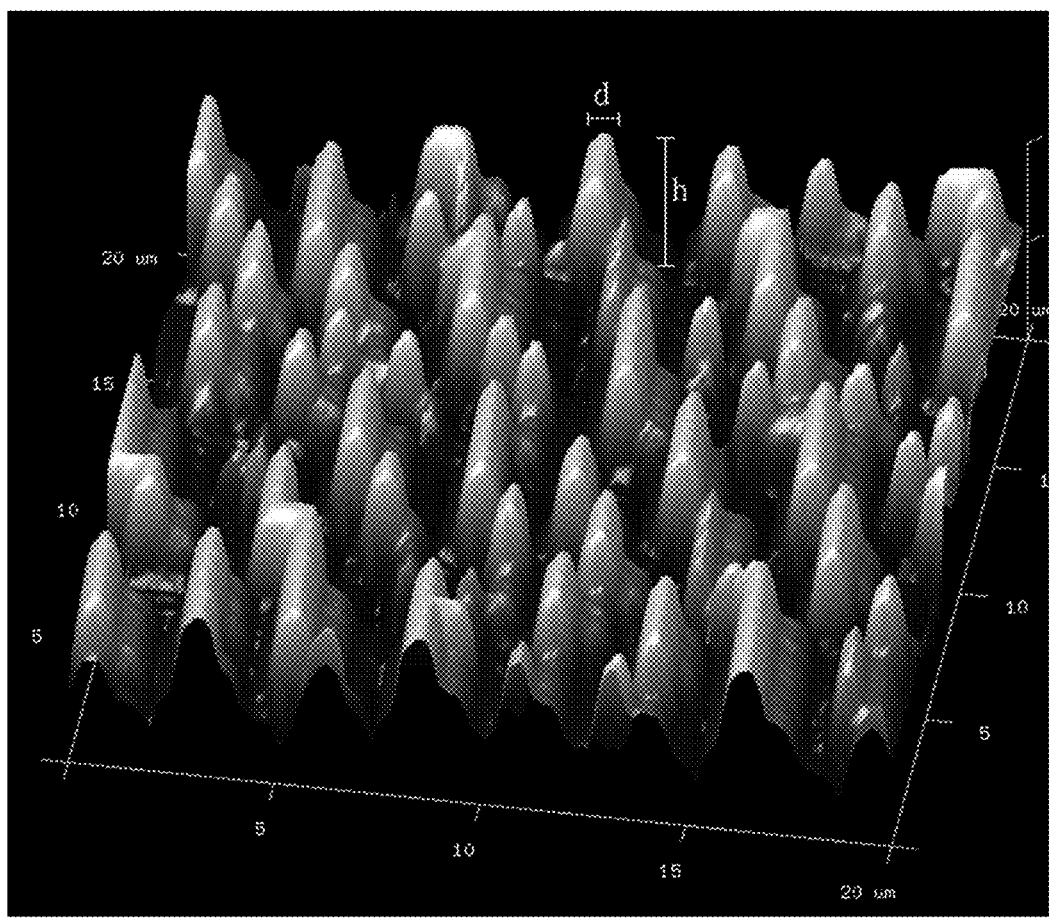
FIG. 13 is a photo obtained by observing a microstructure with an atomic force microscope in the present invention.

FIG. 13 is a photo obtained by observing a microstructure with an atomic force microscope in the present invention. In the embodiment, each microstructure has a rectangular surface shape and consists of multiple nanometer-scale rectangular steps, and the length and width of each single microstructure are both greater than the spot diameter of the laser; and the multiple microstructures on each diffraction optical element have the same shape and size, and every two adjacent microstructures are closely arranged in parallel.

The pattern on each microstructure on the diffraction optical element is centrosymmetric about a certain point, and the geometric center of the whole pattern is moved to the point.

In the embodiment, a motor may also be additionally arranged, the rotating shaft 3 may be connected with a driving shaft of the motor, and a linear motion velocity of the device driven by rotation of the motor is equal to a movement velocity of the microstructures on the diffraction optical element.

In the embodiment, the movement velocity of the microstructure=a rotating velocity of the motor×3.9. In the embodiment, 3.9 is a fixed value, takes mm as a unit and represents a distance between the driving shaft of the motor and a transmission shaft, the transmission shaft being the rotating shaft 3 in FIG. 1, and the unit of the rotating velocity of the motor is rad/s.

In the embodiment, the depth of each step in the single microstructures and a wavelength of the laser meet the following formula:

$$h = \frac{(2^N - 1)\lambda}{2^N(n-1)},$$

wherein h is the depth of the step, λ is the wavelength of the laser, n is a refractive index of a material, $2^N$ is the number of the steps, and in the embodiment, $2^N$=4. FIG. 13 is a photo obtained by observing a microstructure with an atomic force microscope in the present invention, and in the photo, it is shown that d represents the width of each step in the microstructures.

In the embodiment, 4 microstructures are arranged on the diffraction optical element, and the 4 microstructures are closely arranged in a row to form a long strip in parallel with the long edge direction of the mechanical driving device.

Embodiment 2

The embodiment provides a laser animation display method. A display system includes three parts, i.e., a laser source, a diffraction optical element and a mechanical driving device, wherein the diffraction optical element is arranged on the mechanical driving device, multiple microstructures including phase information of associated patterns are arranged on the diffraction optical element, each microstructure corresponds to a different frame of image, and the diffraction optical element is driven by the mechanical driving device to perform relative translation motion relative to a laser beam emitted by the laser source; and the mechanical driving device is a non-gear type device in a circumferential driving device.

The laser animation display method includes the following steps:

S1: the laser source emits laser of which a propagation direction is parallel to a horizontal plane at first, and the laser is caused to be incident on the pattern of a first microstructure on the diffraction optical element placed perpendicularly to the horizontal plane, thereby containing the phase information of the pattern and then forming a corresponding static pattern on a screen;

S2: the diffraction optical element is driven by the mechanical driving device to translate and change its position relative to the incident laser beam in a plane in which the diffraction optical element is located to irradiate the pattern of a second microstructure of the diffraction optical element with the laser, thereby changing the pattern formed by irradiation of the laser, and the patterns on the other microstructures on the diffraction optical element are sequentially irradiated with the laser according to the same method; and S3: according to the foregoing method, the patterns on the diffraction optical element are kept cyclically moved under driving of the mechanical driving device, thereby achieving an animation effect on the screen of the terminal.

As shown in FIGS. 4-7, the circumferential driving device of the embodiment is a non-gear type driving device, including: a second outer frame holder 7, a second middle frame 8, a second inner frame 9, a first sheet metal part 10, a second motor and a second rotating shaft 13, wherein at least a first through hole 11 and a second through hole 12 are formed in the first sheet metal part 10, the diffraction optical element is arranged on the third inner frame 9, and a second microstructure group 15 and a first microstructure group 14 are arranged at positions, corresponding to the first through hole 11 and second through hole 12 of the sheet metal part respectively, on the diffraction optical element respectively. The second motor includes a driving shaft and a transmission shaft, and in the embodiment, the transmission shaft is the second rotating shaft 13, wherein first laser is directly emitted to the second microstructure group 15 through the first through hole 11, and second laser is directly emitted to the first microstructure group 14 through the second through hole 12, wherein the first laser may be green light, and the second laser may be red light. One end of the second rotating shaft 13 is fixedly connected with the transmission shaft of the second motor, and the other end of the second rotating shaft 13 is connected with the second inner frame 9 in a rotating manner. The second middle frame 8 is arranged on the inner side of the second outer frame holder 7, and the second middle frame 8 can move leftwards and rightwards in the second outer frame holder 7, wherein the second inner frame 9 is arranged in the second middle frame 8, and the second inner frame 9 can move upwards and downwards in the second inner frame 8. Upward and downward movement of the second inner frame 9 is combined with leftward and rightward movement of the second middle frame 8 to cause the patterns of the microstructures on the second inner frame 9 to perform circumferential motion relative to the laser. When the second rotating shaft 13 rotates, the rotating shaft 13 can drive the patterns on the inner frame 9 to perform translation motion, and when the patterns of the inner frame 9 perform the translation motion, forward directions of the patterns on the inner frame 9 are kept unchanged. In a static state, each frame of pattern on the second inner frame 9 is rectangularly arranged; and during dynamic translation, each frame of pattern on the microstructures on the inner frame perform the circumferential motion to form a circle, and then the two beams of red and green laser sequentially sweep each frame of pattern on the corresponding microstructure groups according to a circumferential motion sequence to obtain the circular diffraction optical element to achieve a dynamic display effect.

Figure 14:
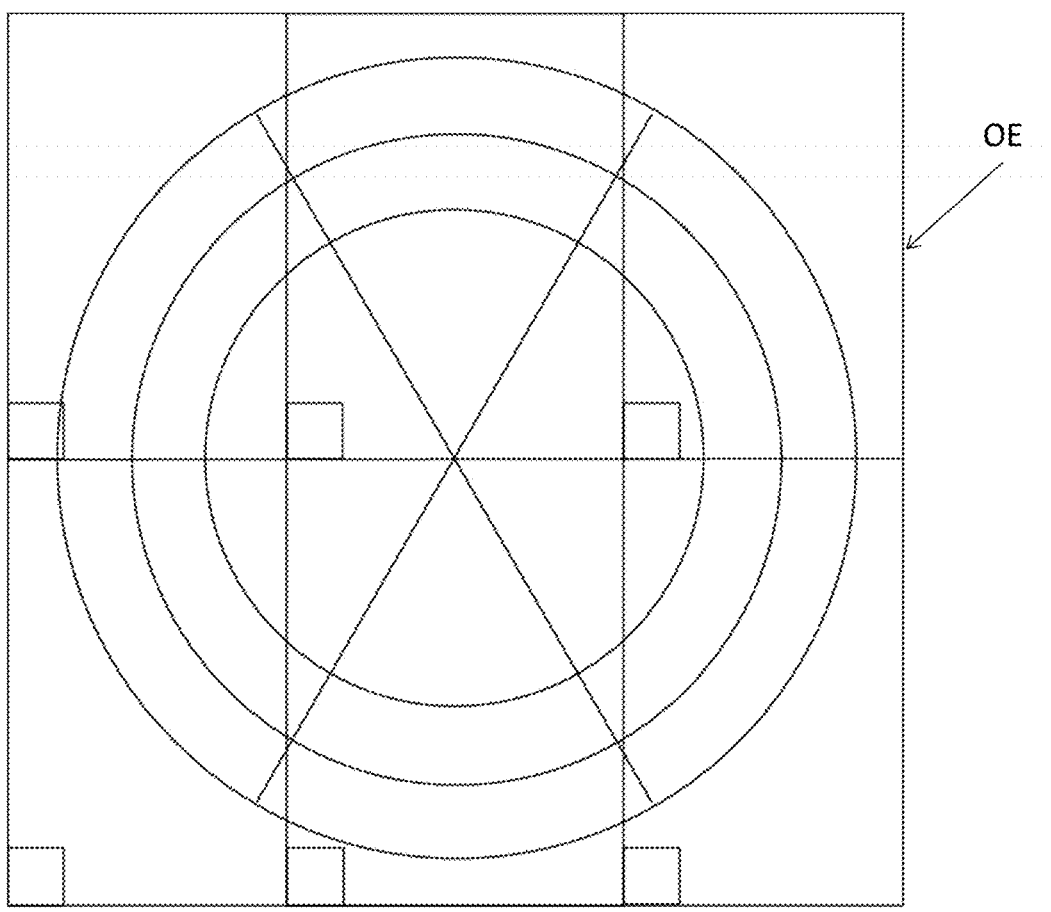
FIG. 14 is an arrangement diagram of microstructures on a diffraction optical element according to the embodiment 2 and the embodiment 3.

In the embodiment, the length and width of each single microstructure are both greater than the spot diameter of the laser; and the multiple microstructures on each diffraction optical element have the same shape and size, and every two adjacent microstructures are closely arranged in parallel. As shown in FIG. 14, multiple microstructures are arranged on the diffraction optical element, an actually effective range is in a circular ring with a diameter R in FIG. 14, the internal diameter of the circular ring is Smm, and the external diameter is Tmm, wherein S>R>T. The microstructures may theoretically be arranged to form a ring. However, the microstructure corresponding to a single frame of pattern is rectangular, so that 6 frames of microstructures are arranged to form a rectangle in FIG. 14 to ensure that an arc length corresponding to the circle with the diameter Rmm is matched with the sizes of the single microstructures after being equally divided into six, that is, arc lengths obtained by equally dividing the middle circle in FIG. 14 into six are just in the single microstructures.

In the embodiment, each microstructure group is a rectangle formed by arranging two of four microstructures with patterns in a transverse direction and a longitudinal direction respectively.

During practical arrangement, it is necessary to ensure that arc lengths obtained by correspondingly and equally dividing the circle with the diameter Rmm into N are matched with the sizes of the microstructures and, meanwhile, an internal circular ring and an external circular ring are matched with the sizes of the microstructures as much as possible.

When the pattern or part of the pattern on each microstructure on the diffraction optical element is centrosymmetric about a certain point, the geometric center of the whole pattern is moved to the point; and when the pattern is a non-centrosymmetric or non-partially centrosymmetric pattern, an off-axis design method is adopted to make an unexpected pattern far away from the geometric center of the pattern.

In the embodiment, a movement velocity of the microstructure=a rotating velocity of the motor×7.5. In the embodiment, 7.5 is a fixed value, takes mm as a unit and represents a distance between the driving shaft of the motor and the transmission shaft, the transmission shaft being the rotating shaft 3 in FIG. 6, and the unit of the rotating velocity of the motor is rad/s.

In the embodiment, the depth of each step in the single microstructures and a wavelength of the laser meet the following formula:

$$h = \frac{(2^N - 1)\lambda}{2^N(n-1)},$$

wherein h is the depth of the step, $\lambda$ is the wavelength of the laser, n is a refractive index of a material, $2^N$ is the number of the steps, and in the embodiment, $2^N=4$. FIG. 13 is a photo obtained by observing a microstructure with an atomic force microscope in the present invention, and in the photo, it is shown that d represents the width of each step in the microstructures.

Embodiment 3

The embodiment provides a laser animation display method. A display system includes three parts, i.e., a laser source, a diffraction optical element and a mechanical driving device, wherein the diffraction optical element is arranged on the mechanical driving device, multiple microstructures including phase information of associated patterns are arranged on the diffraction optical element, each microstructure corresponds to a different frame of image, and the diffraction optical element is driven by the mechanical driving device to perform relative translation motion relative to a laser beam emitted by the laser source; and the mechanical driving device is a gear type device in a circumferential driving device.

The laser animation display method includes the following steps:

S1: the laser source emits laser of which a propagation direction is parallel to a horizontal plane at first, and the laser is caused to be incident on the pattern of a first microstructure on the diffraction optical element placed perpendicularly to the horizontal plane, thereby containing the phase information of the pattern and then forming a corresponding static pattern on a screen;

S2: the diffraction optical element is driven by the mechanical driving device to translate and change its position relative to the incident laser beam in a plane in which the diffraction optical element is located to irradiate the pattern of a second microstructure of the diffraction optical element with the laser, thereby changing the pattern formed by irradiation of the laser, and the patterns on the other microstructures on the diffraction optical element are sequentially irradiated with the laser according to the same method; and S3: according to the foregoing method, the patterns on the diffraction optical element are kept cyclically moved under driving of the mechanical driving device, thereby achieving an animation effect on the screen of the terminal.

As shown in FIGS. 8-11, the circumferential driving device of the embodiment is a gear type driving device, including: a third inner frame 16, a second sheet metal part 17, a rotating shaft and a gear train, wherein at least a third through hole 25 and a fourth through hole 26 are formed in the second sheet metal part 17, the diffraction optical element is arranged on the third inner frame 16, and a fourth microstructure group 19 and a third microstructure group 18 are arranged at positions, corresponding to the third through hole 25 and fourth through hole 26 of the sheet metal part respectively, on the diffraction optical element respectively. Each microstructure group has a rectangular apparent shape, and is formed by arranging two of four microstructures with patterns in a transverse direction and a longitudinal direction respectively, wherein first laser is directly emitted to the fourth microstructure group 19 through the third through hole 25, and second laser is directly emitted to the third microstructure group 18 through the fourth through hole 26, wherein the first laser may be green light, and the second laser may be red light. The rotating shaft includes a third rotating shaft 27 and a fourth rotating shaft 28, the third rotating shaft 27 is connected with a first rotating handle, the fourth rotating shaft 28 is connected with a second rotating handle, and the first rotating handle and the second rotating handle perform synchronous motion to drive the third microstructure group 18 and the fourth microstructure group 19 to perform synchronous translation motion. A first gear 20 is arranged on the middle part of the second sheet metal part 17, the third rotating shaft 27 is connected with the second sheet metal part 17 through a second gear 21, the fourth rotating shaft 28 is connected with the second sheet metal part 17 through a third gear 22, and the first gear 20 is meshed with the second gear 21 and the third gear 22. The third rotating shaft 27 and the fourth rotating shaft 28 may synchronously perform circumferential motion to allow translation motion only to ensure each frame of pattern is upward to achieve a dynamic display effect. In a static state, the patterns of the two microstructure groups on the inner frame are rectangularly arranged, and during dynamic translation, the patterns of the microstructure groups on the inner frame perform circumferential motion to form a circle, then the laser sequentially sweeps the patterns on the microstructures in the circle according to a circumferential motion sequence, and the circular diffraction optical element is obtained. In a display process of each frame, for preventing jitter of the patterns, the diffraction optical element may allow translation motion only. During practical use, two motors may also be additionally arranged, each motor includes a transmission shaft and a driving shaft, and the first rotating handle and the second rotating handle may be connected with the transmission shafts of the two motors to enable the two motors to drive at the same velocity.

In the embodiment, each microstructure consists of multiple nanometer-scale rectangular steps, and the length and width of each single microstructure are both greater than the spot diameter of the laser; and the multiple microstructures on each diffraction optical element have the same shape and size, and every two adjacent microstructures are closely arranged in parallel.

Preferably, when the pattern or part of the pattern on each microstructure on the diffraction optical element is centrosymmetric about a certain point, the geometric center of the whole pattern is moved to the point; and when the pattern is a non-centrosymmetric or non-partially centrosymmetric pattern, an off-axis design method is adopted to make an unexpected pattern far away from the geometric center of the pattern.

In the embodiment, a movement velocity of the microstructure=a rotating velocity of the motor×7.5. In the embodiment, 7.5 is a fixed value, takes mm as a unit and represents a distance between the driving shaft of the motor and the transmission shaft, the rotating shaft 27 and the fourth rotating shaft 28 being the transmission shafts, and the unit of the rotating velocity of the motor is rad/s.

In the embodiment, the depth of each step in the single microstructures and a wavelength of the laser meet the following formula:

$$h = \frac{(2^N - 1)\lambda}{2^N(n-1)},$$

wherein h is the depth of the step, $\lambda$ is the wavelength of the laser, n is a refractive index of a material, $2^N$ is the number of the steps, and in the embodiment, $2^N=4$. FIG. 13 is a photo obtained by observing a microstructure with an atomic force microscope in the present invention, and in the photo, it is shown that d represents the width of each step in the microstructures.

The invention claimed is:

1. A laser animation display method of a display system (DS) which comprises a laser source (L) which emits a laser lamp light (5), a mechanical driving device (M) and a diffraction optical element (OE) arranged on the mechanical driving device (M), wherein a plurality of microstructures (O1, O2, O3, O4) are arranged on the diffraction optical element (OE), and the diffraction optical element (OE) is driven by the mechanical driving device (M) to perform relative translation motion relative to the laser lamp light (5) emitted by the laser source (L);

the laser animation display method comprises the following steps:

S1: emitting the laser lamp light (5), and causing the laser lamp light (5) to irradiate on a first microstructure (O1) arranged on the diffraction optical element (OE) which is placed perpendicular to a plane in a propagation direction of the laser lamp light (5), such that the laser lamp light (5) projects a static image on a screen (B);

S2: driving the diffraction optical element (OE) by the mechanical driving device (M) to translate and change its position relative to the laser lamp light (5) in a plane in which the diffraction optical element (OE) is located so as to cause the laser lamp light (5) to irradiate on a second microstructure (O2) arranged on the diffraction optical element (OE) so as to change the static image formed by the laser lamp light (5) in Step S1, and sequentially irradiating on other microstructures (O3, O4) arranged on the diffraction optical element (OE) with the laser lamp light (5) in the same manner; and S3: repeating Step S2, and keeping cyclically moving the diffraction optical element (OE) driven by the mechanical driving device (M), thereby displaying dynamic images the screen (B).

2. The laser animation display method of claim 1, characterized in that the mechanical driving device (M) comprises an inner frame (2), a middle frame (1) and a rotating shaft (3), wherein the diffraction optical element (OE) is arranged on the inner frame (2), the microstructures with the patterns are arranged abreast on the diffraction optical element (OE), and a guide hole (4) is formed in the inner frame (2); a guide groove (1S) is formed in an inner side of the middle frame (1), and the inner frame (2) is arranged in the guide groove (1S) of the middle frame (1); and one end of the rotating shaft (3) is arranged in the guide hole (4), the other end of the rotating shaft (3) is connected with a rotating handle (6), and the rotating handle (6) enables the rotating shaft (3) to drive the inner frame (2) to perform a linear translation motion.

3. The laser animation display method of claim 2, characterized in that the patterns of the diffraction optical element (OE) are closely arranged in a row to form a long strip in parallel with a long edge direction of the mechanical driving device (M).

4. The laser animation display method of claim 1, characterized in that the circumferential driving device (M) comprises a second outer frame holder (7), a second middle frame (8), a second inner frame (9), a first sheet metal part (10), and a second rotating shaft (13), wherein at least a first through hole (11) and a second through hole (12) are formed in the first sheet metal part (10), the diffraction optical element (OE) is arranged on the second inner frame (9), a second microstructure group (15) and a first microstructure group (14) are arranged on the diffraction optical element (OE) respectively corresponding to the first through hole (11) and second through hole (12), one end of the second rotating shaft (13) is connected with the second inner frame (9) in a rotating manner, the second middle frame (8) is arranged in the second outer frame holder (7), the second middle frame (8) is able to move leftwards and rightwards in the second outer frame holder (7), the second inner frame (9) is arranged in the second middle frame (8), and the second inner frame (9) is able to move upwards and downwards in the second middle frame (8).

5. The laser animation display method of claim 4, characterized in that the patterns of the diffraction optical element (OE) are rectangles formed by combining at least two or more microstructures in length and width.

6. The laser animation display method of claim 1, characterized in that the circumferential driving device comprises a third inner frame (16), a second sheet metal part (17), a third rotating shaft (27), a fourth rotating shaft (28) and a gear train, wherein at least a third through hole (25) and a fourth through hole (26) are formed in the second sheet metal part (17), the diffraction optical element (OE) is arranged on the third inner frame (16), and a fourth microstructure group (19) and a third microstructure group (18) are arranged on the diffraction optical element (OE) respectively corresponding to the third through hole (25) and fourth through hole (26), wherein the third rotating shaft (27) is connected with a first rotating handle (271), the fourth rotating shaft (28) is connected with a second rotating handle (281), and the first rotating handle (271) and the second rotating handle (281) moves synchronously to drive the third microstructure group (18) and the fourth microstructure group (19) to perform a synchronous translation motion.

7. The laser animation display method of claim 6, characterized in that the patterns of the diffraction optical element (OE) are rectangles formed by combining at least two or more microstructures in length and width.

8. The laser animation display method of claim 1, characterized in that length and width of each microstructure are both greater than a spot diameter of the laser lamp light (5); and the microstructures have the same shape and size, and every two adjacent microstructures are closely arranged.

9. The laser animation display method of claim 1, characterized in that a motion velocity of the mechanical driving device (M) is equal to a movement velocity of the microstructures on the diffraction optical element (OE).

10. The laser animation display method of claim 1, characterized in that each microstructure comprises a plurality of steps, and a depth of each step and a wavelength of the laser lamp light (5) satisfy the following formula:

$$h = \frac{(2^N - 1)\lambda}{2^N(n-1)},$$

wherein h is the depth of the step, $\lambda$ is the wavelength of the laser lamp light (5), n is a refractive index of a material, and $2^N$ is the number of the steps.

* * * * *